Sept. 14, 1926.                J. C. WELLS                1,599,856
                           OPHTHALMIC MOUNTING
                           Filed Jan. 11, 1924

INVENTOR
JOEL C. WELLS.
BY
Harry H. Styll.
ATTORNEY

Patented Sept. 14, 1926.

1,599,856

UNITED STATES PATENT OFFICE.

JOEL C. WELLS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed January 11, 1924. Serial No. 685,533.

This invention relates to improvements in ophthalmic mountings and has particular reference to lens straps used in connection with frameless spectacle and eyeglass constructions.

One of the important objects of the invention is to provide an improved lens strap which may be accurately positioned so that the apertures for its clamping member will be in proper concentric alinement with the customary aperture in the lens.

Another object of the invention is to provide such a device wherein lateral movement of the lens strap on the lens will be impossible.

Another object is to provide such a device wherein the clamping pressure will be evenly distributed on the lens surface with a minimum liability of breakage.

With these and other objects in view the invention resides in the details of construction and arrangement of parts as hereinafter more fully set forth, illustrated in the accompanying drawings and specifically pointed out in the appended claims.

In the accompanying drawings wherein is shown a preferred embodiment of the invention, Figure 1 is a front elevation of a spectacle embodying the invention.

Similar reference characters designate corresponding parts throughout the several views of the drawings.

Figure 1:
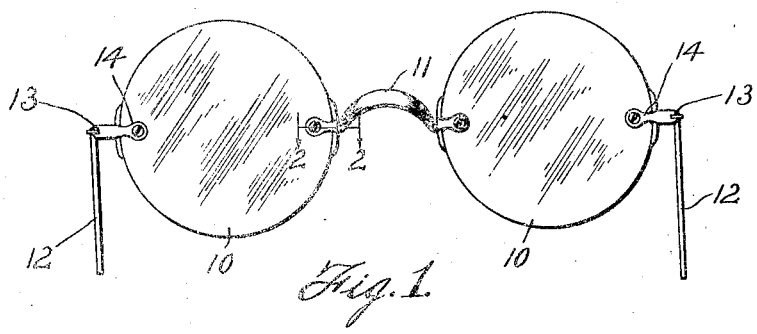
Figure 2:
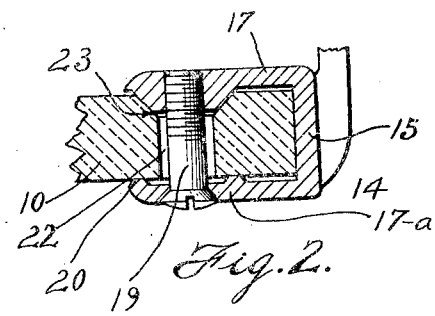
Figure 2 is an enlarged sectional view on the line 2—2 of Figure 1.

The ophthalmic mounting illustrated in Figure 1 comprises the usual pair of lenses 10 connected by a bridge 11 and adapted to be held in place by the temples 12 which are carried by suitable endpieces 13 of any desired form. Secured to each end of the bridge 11 as by soldering or any other desired means and to each endpiece 13 is a lens strap which I have designated generally by the numeral 14.

Figure 3:
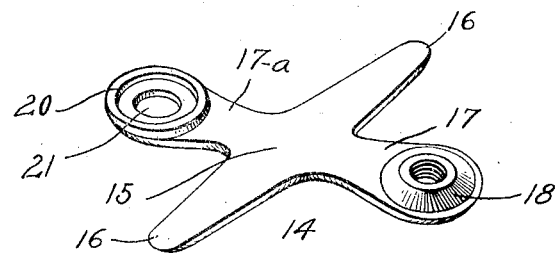
Figure 3 is an enlarged detailed perspective view of my improved lens strap per se.

As best shown in Figure 3 the strap 14 comprises a lens edge engaging body portion 15 which has the usual extensions 16 thereon for the prevention of rocking movement of the strap after it is applied, and a pair of clip ears 17 and 17ª which are adapted to be bent so as to overlie the opposing surfaces of the lens 10. One of the clip ears 17 is provided on its inner surface with a boss 18 which is preferably tapered as clearly illustrated and provided with a threaded aperture for the reception of a clamping screw 19. The other clamping ear 17ª has a narrow bearing surface 20 which is preferably annular as shown, and it is provided with a countersunk aperture 21 for the reception of the head of the clamping screw 19. The size of the annulus 20 is greater than that of the aperture 22 in the lens 10 so that when the clamping pressure is applied by means of the screw 19 it will be uniformly distributed upon the lens surface at a distance from the edge of the lens aperture. The aperture 22 is countersunk in one end as clearly indicated at 23, said countersink being adapted to receive the tapered boss 18 in the clamp ears 17.

It will be noted that the lens aperture 22 is of a slightly larger diameter than the screw member 19 and obviously the tapered boss 18 when properly positioned within the countersink 23 will position the strap so that the threaded aperture will be in substantially concentric alinement with the aperture 22. In this way the screw 19 will not contact the lens at any point and because of the fact that the bearing surface 20 is of a greater diameter than that of the aperture 22 the clamping pressure exerted by the screw 19 will not tend to chip the material of the lens.

From the foregoing it will be evident that I have provided an improved lens strap which may be easily and accurately positioned upon the lens and which will have a minimum tendency for working loose therein. The strap is adapted to be used in connection with any form of bridge, either for spectacles or eyeglasses, and for any type of endpieces and it is to be understood that I do not limit myself to the precise details and arrangement of parts illustrated in the drawing but I reserve the right to make changes in the same falling within the scope of the appended claims.

Having thus described my invention, what I claim is:

1. In a device of the character described a lens clamp comprising a pair of spaced lens clip ears, one ear having an internal tapered boss with an opening therethrough and the other ear having an opening aligned with the opening of the first ear and an annular rib extending from the inside thereof and spaced from and surrounding the opening, said rib being adapted to engage the face of the lens and leave a recess between the lens and the remaining part of the ear both inside and outside of the rib, and retaining means through the openings in the ears adapted to draw the ears towards each other on the lens with resilient pressure due to the resiliency of the recessed portion around the opening in the second ear inside of the annular rib.

2. In a device of the character described a lens clamp comprising a pair of spaced lens clip ears, one ear having a perforated tapered boss extending from the inside thereof and the other ear having an opening aligned with the opening in the first ear and an internal annular recessed portion surrounding the opening and a second recessed portion spaced from the first recessed portion, and retaining means through the aligned openings to draw the two ears into contact with the lens to hold the parts together, the second ear contacting with the lens only on the portion between the spaced recessed portions whereby a resilient pressure is obtained on the retaining means due to the recessed portion surrounding the opening in the second ear.

JOEL C. WELLS.